(12) United States Patent
Schwartz

(10) Patent No.: US 9,838,426 B2
(45) Date of Patent: *Dec. 5, 2017

(54) HONEYPORT ACTIVE NETWORK SECURITY

(71) Applicant: General Electric Company, Schenectady, NY (US)

(72) Inventor: Matthew Richard Schwartz, Mechanicville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,150

(22) Filed: Sep. 2, 2016

(65) Prior Publication Data

US 2016/0373483 A1    Dec. 22, 2016

Related U.S. Application Data

(63) Continuation of application No. 13/907,867, filed on Jun. 1, 2013, now Pat. No. 9,436,652.

(51) Int. Cl.
*G06F 7/04* (2006.01)
*H04L 29/06* (2006.01)
*G06F 15/173* (2006.01)
*G06F 21/56* (2013.01)

(52) U.S. Cl.
CPC ........ *H04L 63/1491* (2013.01); *G06F 15/173* (2013.01); *G06F 21/567* (2013.01); *H04L 63/1416* (2013.01)

(58) Field of Classification Search
CPC ... H04L 63/1491; G06F 15/173; G06F 21/567

USPC ........................................................ 726/2-4
See application file for complete search history.

(56) References Cited

U.S. PATENT DOCUMENTS

| | | | |
|---|---|---|---|
| 7,086,089 B2 | 8/2006 | Hrastar et al. | |
| 2004/0172557 A1* | 9/2004 | Nakae ................. | H04L 63/0227 726/22 |
| 2005/0021827 A1* | 1/2005 | Matsuura ............ | H04L 12/2697 709/232 |
| 2008/0018927 A1 | 1/2008 | Martin et al. | |
| 2008/0141374 A1 | 6/2008 | Sidiroglou et al. | |
| 2008/0263647 A1 | 10/2008 | Barnett et al. | |
| 2012/0084866 A1* | 4/2012 | Stolfo .................. | G06F 21/554 726/25 |
| 2012/0151589 A1 | 6/2012 | Hershey et al. | |
| 2012/0246724 A1* | 9/2012 | Sheymov ............ | H04L 63/1416 726/22 |

(Continued)

OTHER PUBLICATIONS

International Search Report and Written Opinion issued in connection with corresponding PCT Application No. PCT/US2014/034751 dated Aug. 28, 2014.

*Primary Examiner* — Anthony Brown
(74) *Attorney, Agent, or Firm* — Fletcher Yoder, P.C.

(57) ABSTRACT

A device comprises a processor. The processor is configured to generate a first signal using a first communication protocol. The first signal corresponds to data received by the processor. The processor is configured to generate a second signal using a second communication protocol. The second signal comprises fabricated data generated by the processor. Additionally, the processor is configured to transmit the first signal. The processor is also configured to transmit the second signal.

20 Claims, 4 Drawing Sheets

(56) References Cited

U.S. PATENT DOCUMENTS

| | | |
|---|---|---|
| 2012/0297452 A1 | 11/2012 | Munetoh et al. |
| 2013/0031358 A1 | 1/2013 | Holland et al. |
| 2013/0054474 A1* | 2/2013 | Yeager ............... G06Q 20/3223 |
| | | 705/71 |
| 2013/0163483 A1* | 6/2013 | Sarraf .................... H01Q 1/521 |
| | | 370/277 |

* cited by examiner

HONEYPORT ACTIVE NETWORK SECURITY

CROSS-REFERENCE TO RELATED APPLICATION

The present application is a Continuation Application of U.S. patent application Ser. No. 13/907,867, entitled "Honeyport Active Network Security," filed Jun. 1, 2013, now U.S. Pat. No. 9,436,652, which issued on Sep. 6, 2016, and is hereby incorporated by reference herein its entirety for all purposes.

BACKGROUND

The subject matter disclosed herein generally relates to network security as well as the security of control systems and control networks coupled to a computer network.

Computer networks and network technologies are expanding into areas where they were not previously present. For example, monitoring and/or control systems (e.g., industrial control systems) that monitor and control the operation of machinery, such as wind turbines, gas turbines, compressors, motors, generators, and other devices, have increasingly become interconnected. This interconnection may allow for sharing of information between physically separate machinery and, for example, a single monitoring station. However, as traditionally closed (i.e., non-networked) systems have become interconnected, the potential threat from cyber attacks (e.g., hacking) has also increased.

Some attempts at improving security for industrial control systems have been made. For example, control hierarchy models, such as the Purdue model, have been implemented. While these models have provided a helpful, common language for industrial control systems ("ICS") owners, operators, and suppliers to use to frame security discussions, the implicit assumptions of static data flows, centralized control and security solely through perimeters may prove to be outdated. Indeed, advancements in both ICS technology (distributed control, smart devices, and interoperability) and increasingly sophisticated vulnerability exploitation may lead to a desire for more robust models and techniques for intrusion detection. Furthermore, emergent forces such as virtualization, collaboration/socialization, and cloud-based infrastructure/services may further call into question the adequacy of a defensive posture built solely on perimeter security (i.e., network security focused mainly on preventing entry to a system).

Additionally, further security issues may arise when the ICS is coupled to, for example, a corporate network. End Point Security is one technique that has been utilized to prevent unauthorized access to a corporate network, whereby an enterprise authenticates and scans each device or host before granting access to the corporate network. However, the explosion of consumer products, which enhance productivity yet demand increased access to the network, has led toward a model where protection at the network edge may be insufficient. Accordingly, with end users clamoring for numerous devices and constant connectivity to the enterprise, data often flows into and out of a network in an unmonitored and potentially unsecured way. Additionally, with the use of personal cloud storage and social networking, the risk for loss of or manipulation of sensitive data may prove to be significantly higher.

In view of the increased likelihood of cyber attacks to both an ICS, as well as a corporate network that the ICS may be coupled to, there is a need for increased security related to the detection of unauthorized entry to both an ICS as well as a corporate network. Therefore, it would be desirable to implement a system and techniques to overcome challenges in the art and allow for increased detection of an attempted intrusion into a network.

BRIEF DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In one embodiment, a device includes a processor configured to generate a first signal using a first communication protocol, wherein the first signal corresponds to data received by the processor, generate a second signal using a second communication protocol, wherein the second signal comprises fabricated data generated by the processor, and transmit the first and second signals.

In another embodiment, a non-transitory computer-readable medium having computer executable code stored thereon includes code comprising instructions to receive data, generate a first signal using a first communication protocol, wherein the first signal corresponds to the received data, generate a second signal using a second communication protocol, wherein the second signal comprises fabricated data, and transmit the first and second signals.

In a further embodiment, a device includes a memory configured to store instructions, and a processor configured to execute the stored instructions to receive data corresponding to operational characteristics of machinery, generate a first signal using a first communication protocol related to the machinery, wherein the first signal corresponds to the data received by the processor, generate a second signal using a second communication protocol related to the machinery, wherein the second signal comprises fabricated data generated by the processor, and transmit the first and second signals.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
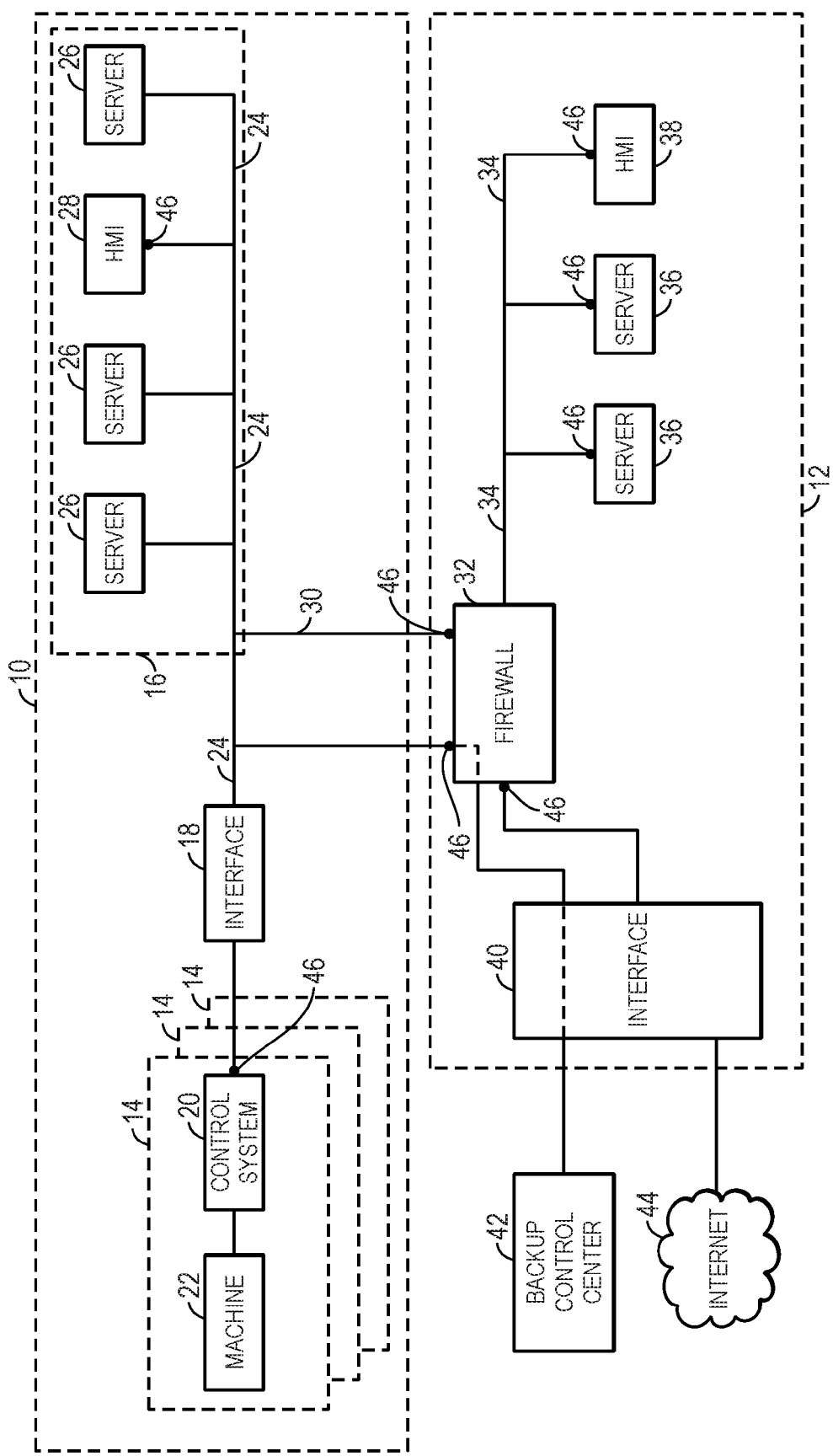
FIG. 1 is a block diagram view of an embodiment including a computer network and an industrial control system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A system and techniques for detecting intrusion to an industrial control system ("ICS") is set forth in detail below. The techniques include use of honeyports and/or honeypots, which allow for the creation of fake services that appear legitimate to attackers. Honeyports may be dummy ports that monitor for a connection being made and report when the connection has been established. Honeyports may include fake services that may entice port scanners of hackers to connect thereto. A honeypot may be a partial or full system (e.g., decoy servers or systems) setup to gather information regarding an attacker or intruder into a network. The use of honeyports and/or honeypots may cause an attacker to make additional pivots in the system, stay connected longer, and to be more likely to identify themselves or motives. Accordingly, honeyports, if implemented correctly, can help to alert system stewards to spurious activities (e.g., reconnaissance on the network). By focusing on reconnaissance and actionable threat information, the network will be able to detect attacks sooner, and will be positioned to rapidly investigate and respond, as opposed remaining relatively exposed to zero day threats.

The successful implementation of honeyports in an ICS includes the ability to capture remote data that could be used to assist identifying the attacker regardless of the type of network port scans, as well as generation of and presentation of an accurate representation of a service that would be expected in the represented operating environment. This may include, for example, displaying of a fake or vulnerable application/version banner information and/or a pre-canned or randomized string reply, for example, to a full TCP connect session. Additionally, there may be a dynamic update of firewalls based on connections that are not in a whitelist (e.g., a list or register of entities that are being provided a particular privilege, service, mobility, access, or recognition) or one that trips multiple honeyports even if whitelisted.

With the foregoing in mind, FIG. 1 illustrates a block diagram view of an industrial control system ("ICS") 10 and a computer network 12, such as a corporate computer network. In some embodiments, the ICS 10 may include one or more field locations 14, a control system network 16, and a communication interface 18 there between. The field locations 14 may include a control system 20 as well as machinery 22 to be monitored. In some embodiments, the control system 20 may monitor one or more operating parameters of the machinery 22. In certain embodiments, the machinery 22 may be representative of one or more of the following: wind turbines, steam turbines, hydraulic turbines, gas turbines, aeroderivative turbines, compressors, gears, turbo-expanders, centrifugal pumps, motors, generators, fans, blowers, agitators, mixers, centrifuges, pulp refiners, ball mills, crushers/pulverizers, extruders, pelletizers, cooling towers/heat exchanger fans, and/or other systems suitable to be monitored.

During operation of the machinery 22, one or more sensors may measure one or more operating parameters of the machinery 22 and transmit the measured values as signals to the control system. The sensors may be transducers or other suitable measurement devices, which can be used to measure various parameters of the machinery 22 or components therein, for example, the rotational speed of a shaft of a turbine, the operating temperature of a turbine, or other similar operating parameters. The sensors may transmit the signals related to the operating parameter of machinery 22 to be monitored to control system 20.

In some embodiments, the control system 20 may be a monitoring system similar to or may be, for example, a SPEEDTRONIC™ Mark VI Turbine Control System made available by General Electric® of Schenectady, N.Y., or a similar system. In one embodiment, the control system 20 may receive the signal indicative of measured operating parameters of the machinery 22 and may record and/or analyze the signal indicative of measured operating parameters of the machinery 22, for example, to generate control signals used to adjust input values for the machinery 22 (e.g., to control the operation of the machinery 22).

In some embodiments, the control system 20 may transmit information related to the operation of the machinery 22 to interface 18. Interface 18 may be a router or other network device that transmits communication signals. Additionally or alternatively, interface 18 may be a communication interface that alters signals transmitted between the field locations 14 and control system network 16 (e.g., converts signals from one communication protocol to another). Interface 18 may transmit signals received between field locations 14 and control system network 16 along signal path 24, which may be a physical connection or a wireless connection. For example, signal path 24 may be a wired connection, such as an Ethernet connection and/or the like. Alternatively, signal path 24 may be a wireless signal path, such as a local area network (LAN) (e.g., Wi-Fi), a wide area network (WAN) (e.g., 3G or 4G), a Bluetooth network, and/or part of another wireless network.

As illustrated in FIG. 1, signal path 24 may be coupled to one or more servers 26 as well as a human machine interface 28 in the control system network 16. The servers 26 may include, for example, data acquisition servers that allow for the storage and/or retrieval of field location 14 data, database servers that provide database services to other computer programs or computers, and or other various servers. Additionally, as previously set forth, the control system network 16 may include one or more human machine interfaces 28, which may, for example, include a workstation and/or computer. This workstation or computer may be utilized, for example, to display information to a user related to one or more field locations 14 to allow for monitoring and/or control of the elements present in one or more of the field locations 14.

In some embodiments, the control system network 16 may be coupled to the computer network 12, for example, along signal path 30. Signal path 30 may be a physical connection or a wireless connection, similar to signal path 24 described above. In one embodiment, the signal path 30 may couple the control system network 16 to a firewall 32 in the computer network 12. This firewall 32 may, for example, be a software or hardware-based network security system that controls incoming and outgoing network traffic by analyzing received data packets to determining whether the received packets are authorized. That is, the firewall 32 may prevent unauthorized access to signal path 34 of the computer network 12, as well as one or more servers 36 and human machine interfaces 38 coupled thereto.

The servers 36 may include, for example, email servers that allow for the storage and/or exchange of electronic messages, business servers that provide database services to other computer programs or computers, and or other various servers. Additionally, similar to the control system network 16, the computer network 12 may include one or more human machine interfaces 38, which may, for example, include a workstation and/or computer. This workstation or computer may be utilized, for example, to allow for interaction of one or more users with the servers 36, as well as general or prescribed access to various portions of the computer network 12.

The human machine interfaces 38 may not only interface with elements in the computer network 12 (e.g., via an intranet connection). Indeed, the human machine interfaces 38 (as well as one or more of the servers 36) may also interface with entities outside of the computer network 12. This may be accomplished via a connection through interface 40, which may be one or more routers and/or other communication infrastructures, to the internet 44. The interface 40 may also, in some embodiments, allow for transmission of signals from a backup control center 42 to the control system network 16 (specifically, signal path 24) to allow for secondary monitoring and/or control of the elements of one or more field locations 14. In some embodiments, backup control center 42 may operate when problems cause portions of the control system network 16 to fail, thus reducing and/or eliminating the monitoring and/or control of the elements of the various field locations 14.

In this manner, the various elements of computer network 12 and the control system network 16 may be interconnected. Moreover, in this manner, access to outside users and networks may be accomplished. However, having networks that allow for external access also may also give rise to the desirability of increasing the security of those networks. One technique to increase the security of both the computer network 12 and the control system network is to implement an intrusion detection system (IDS). An IDS is a device and/or software application (e.g., stored on a device such as memory or storage) that allows for monitoring of network or system activities. Specifically, the IDS may search for malicious activities, hacking attempts, policy violations, or other suspicious network behavior and transmit indications of the activities (e.g., log the instances) to a management station and/or system (which, for example, may be located in one or both of the servers 26 and 36.

To aid in the detection of suspicious and/or malicious network use, the IDS may include IDS sensors 46. These IDS sensors 46 may be present at various points of the computer network 12 and may operate to check for attacks or undesired intrusions from, for example, the internet 44. However, attacks/malicious activity may also impact the ICS 10. Accordingly, IDS sensors 46 may also be included, for example, in the various field locations 14 as well as the control system network 16. For example, an IDS sensor 46 may be located in the control system 20 and in human machine interface 28. The implementation and operation of these IDS sensors 46, as well as the overall IDS itself, will be detailed in conjunction with the figures described below.

Figure 2:
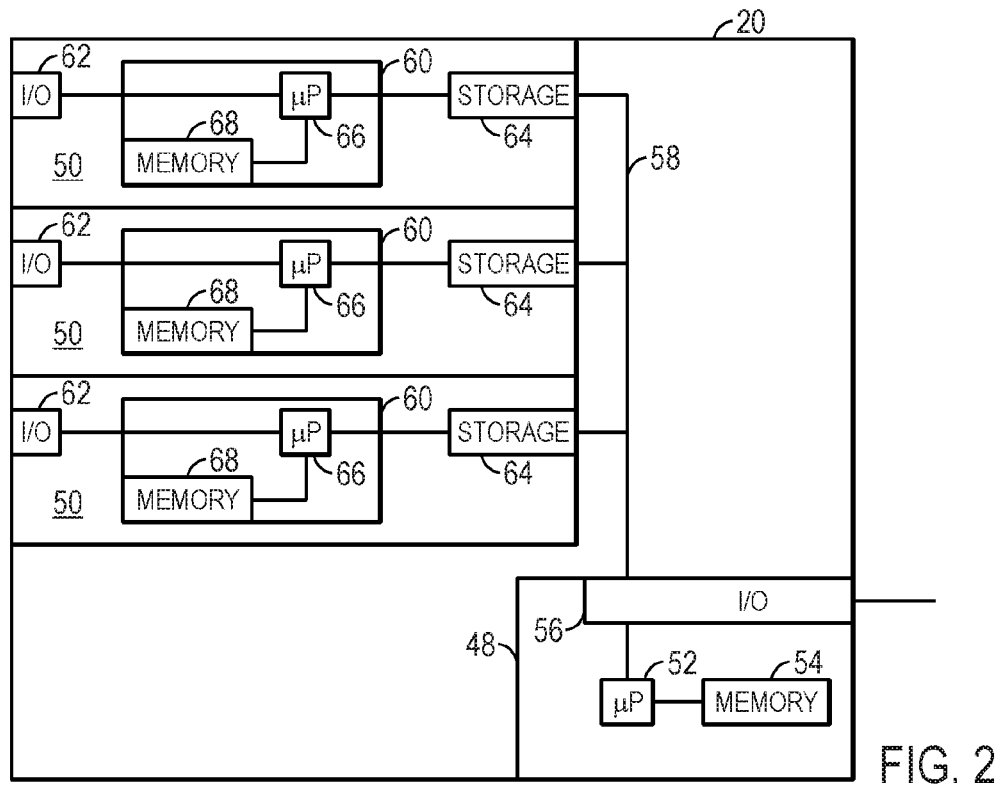
FIG. 2 is a block diagram of the control system of FIG. 1, in accordance with an embodiment.

FIG. 2 illustrates the control system 20 of FIG. 1. In some embodiments, the control system 20 may include a control module 48 as well as one or more input/output (I/O) cards 50, for example, arranged in a card rack. In some embodiments, the control module may include a processor(s) 52 and/or other data processing circuitry (e.g., general central processing units (CPUs), embedded CPUs, systems on a chip (SOC), application specific processors, application specific integrated circuits (ASICs), field programmable gate arrays (FPGAs), and their combinations) which may be operably coupled to memory 54 and to execute instructions for carrying out the presently disclosed techniques. These instructions may be encoded in programs that may be executed by the processor 52. The instructions may be stored in any suitable article of manufacturer that includes at least one tangible, computer-readable medium that at least collectively stores these instructions or routines, such as memory 54.

Memory 54 may include, for example, random-access memory, read-only memory, rewritable memory, flash memory, and/or other physical storage devices. The control module 48 may also include an input/output (I/O) interface 56. This I/O interface 56 may connect the control system 20 to the interface 18 of FIG. 1 to allow for communication via a personal area network (PAN) (e.g., Bluetooth), a local area network (LAN) (e.g., Wi-Fi), a wide area network (WAN) (e.g., 3G or LTE), an Ethernet connection, and/or the like. Accordingly, through the I/O interface 56, the control system 20 may communicate with signal path 24, for example, to enable cloud storage, processing, and/or communication with other networked devices, such as the servers 26 and the HMI 28.

The control system 20 also may include an internal bus 58 that couples the control module 48 to each of the I/O cards 50, for example, to allow for communication of data from the I/O cards 50 to the control module 48. Additionally, the internal bus 58 may allow for inter-card communication between I/O cards 50. Additionally, as illustrated, each of the I/O cards 50 may include a digital signal processor (DSP) 60, an I/O interface 62, and storage 64. The DSP 60 may receive signals from the I/O interface 62 that are related to the operation of the machinery 22. Specifically, the DSP 60 may be a circuit or one or more circuits on a circuit board that includes a processor 66 and a memory 68 that may be utilized in conjunction to digitally filter and/or process data received from the I/O interface 62. For example, the processor 66 may utilize a software program stored in the memory 68 (e.g., random-access memory, read-only memory, flash memory, or other types of memory that may be on board of the DSP 60) to digitally filter and/or process data received from the I/O interface 62. This processed data may then be transmitted to storage 64 (random-access memory, read-only memory, rewritable memory, flash memory, and/or other physical storage devices) for retrieval, for example, by control module 48. Moreover, while a DSP 60 is illustrated, it may be appreciated that other types of computational processing units may be utilized in place of the DSP 60, such as general CPUs, embedded CPUs, SOCs, application specific processors, ASICs, FPGAs, and their combinations, along with their associated memory devices.

As previously noted, the field locations 14 may act as an access point for malicious entry into the ICS 10 and/or the computer network 12. To aid in detection of unauthorized access, IDS sensors 46 may be utilized. These IDS sensors 46 may be found in each of the I/O cards 50 and/or in the control module 48. For example, ICS 10 may use a first communication protocol (e.g., protocol A) for communication of actual ICS data between machinery 22, control system 20, and control network 16. In one embodiment, a second communication protocol (e.g., protocol B) may be set up as a dummy protocol, which may include fabricated data generated by the processor 52 or 66. These communication protocols A and B may include, for example, DM3 serial communication signals, Modbus communication signals, industrial control communication signals, automation communication signals, and/or other communication protocols.

Accordingly, the DSP 60 may generate dummy communications using protocol B and transmit these dummy communications in parallel with actual communication transmissions of protocol A. Thus, while signals transmitted with protocol A may actually correspond to the operation of machinery 22 and the operation of the ICS 10, the signals with protocol B do not correspond to any actual operation of the ICS 10. Instead, the signals with protocol B include fabricated data that may be utilized to determine if malicious attempts to access ICS 10 are occurring.

In one embodiment, the circuitry of DSP 60 may generate these signals with protocol B. For example, the processor 66 running a software program stored in memory 68 may generate protocol B signals and transmit the fabricated data signals that mimic actual signals that would typically be transmitted from a respective I/O card 50. The processor 66 may generate these signals with communication protocol B in conjunction with signals with protocol A for simultaneous and/or sequential transmission.

Additionally or alternatively, the circuitry of control module 48 may generate these signals with protocol B. For example, the processor 52 running a software program stored in memory 54 may generate protocol B signals and transmit the fabricated data signals that mimic actual signals that would typically be transmitted from the control module 48. The processor 52 may generate these signals with communication protocol B in conjunction with signals with protocol A for simultaneous and/or sequential transmission.

Furthermore, DSP 60 and/or control module 48 (specifically processors 66 and 52) may detect if communication is initiated utilizing protocol B. That is, if a malicious or unwanted outside attacker attempts to access the control system 20 using signals that include or mirror transmission protocol B, because signals utilizing protocol B are generated as dummy signals, the intruder may be detected. This process will be outlined in greater detail with respect to FIG. 5 described below. In this manner, an IDS sensor 46 is present in control module 20, since the false signals with protocol B act as a honeyports that aid in the detection of unauthorized access to the ICS 10.

Figure 3:
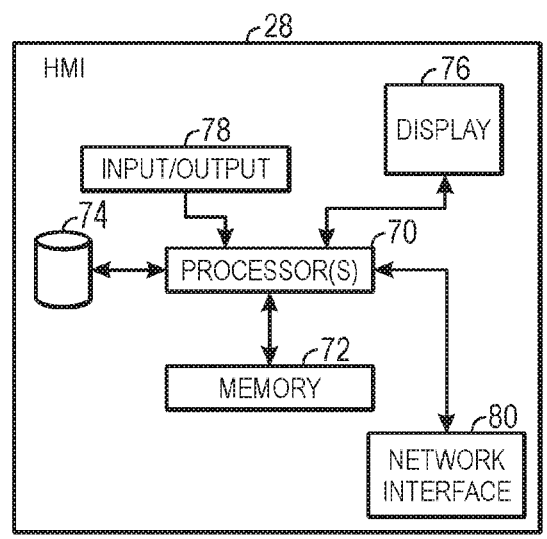
FIG. 3 is a block diagram of human machine interface of FIG. 1, in accordance with an embodiment.

An IDS sensor 46 may also be present in other portions of the ICS 10. For example, the human machine interface 28 of the ICS 10 may include an IDS sensor in a substantially similar manner to that described above with respect to the control system 20. FIG. 3 illustrates a detailed block diagram of the human machine interface 28 that may incorporate this IDS sensor 46.

As illustrated in FIG. 3, the human machine interface 28 includes processor 70 and/or other data processing circuitry may be operably coupled to memory 72 and storage 74 to execute instructions for carrying out the presently disclosed techniques. These instructions may be encoded in programs that may be executed by the processor 70 and/or other data processing circuitry (e.g., general CPUs, embedded CPUs, SOCs, application specific processors, ASICs, FPGAs, and their combinations). The instructions may be stored in any suitable article of manufacturer that includes at least one tangible, computer-readable medium that at least collectively stores these instructions or routines, such as the memory 72 or the storage 74. The memory 72 and the storage 74 may include, for example, random-access memory, read-only memory, rewritable memory, a hard drive, and/or optical discs.

The human machine interface 28 also may include a display 76 that may display a graphical user interface (GUI) of the human machine interface 28. As should be appreciated, the human machine interface 28 may include a variety of other components, such as a power supply, a keyboard, a mouse, a track pad, and/or a touch screen interface, and so forth. By way of example, the human machine interface 28 may also include input/output (I/O) ports 78 as well as a network interface 80. The network interface 80 may provide communication via a personal area network (PAN) (e.g., Bluetooth), a local area network (LAN) (e.g., Wi-Fi), a wide area network (WAN) (e.g., 3G or LTE), Ethernet, and/or the like. Through the network interface 80, the human machine interface 28 may communicate over signal path 24 for example, to enable processing and/or communication with other networked devices, such as the servers 26 and/or control system 20.

As previously noted, the human machine interface 28 may act as an access point for malicious entry into the ICS 10 and/or the computer network 12. To aid in detection of unauthorized access, IDS sensors 46 may be utilized. These IDS sensors 46 may be found in the human machine interface 28. For example, ICS 10 may use a first communication protocol (e.g., protocol A) for communication of actual ICS data between machinery 22, control system 20, and control network 16. In one embodiment, a second communication protocol (e.g., protocol B) may be set up as a dummy protocol, which may include fabricated data generated by the processor 70. These communication protocols A and B may include DM3 serial communication signals, Modbus communication signals, industrial control communication signals, automation communication signals, and/or other communication protocols.

Accordingly, the processor 70 may generate dummy communications using protocol B and transmit these dummy communications in parallel with actual communication transmissions of protocol A. Thus, while signals transmitted with protocol A may actually correspond to the operation/control of machinery 22 and the operation of the ICS 10, the signals with protocol B do not correspond to any actual operation of the ICS 10. Instead, the signals with protocol B are utilized to determine if malicious attempts to access ICS 10 are occurring.

In one embodiment, for example, the processor 70 running a software program stored in memory 72 may generate protocol B signals and transmit dummy signals that mimic actual signals that would typically be transmitted from a respective human machine interface 28. The processor 70 may generate these signals with communication protocol B in conjunction with signals with protocol A for simultaneous and/or sequential transmission.

Additionally, processor 70 may detect if communication is initiated utilizing protocol B. That is, if a malicious or unwanted outside attacker attempts to access the human machine interface 28 using signals with transmission protocol B, signals utilizing protocol B are generated as dummy signals, the intruder may be detected. This process will be outlined in greater detail with respect to FIG. 4 described below. In this manner, an IDS sensor 46 is present in human machine interface 28, since the false signals with protocol B act as a honeyport that aids in the detection of unauthorized access to the ICS 10.

It should be noted that this technique of implementation of IDS sensors 46 may also be applied to detect, for example, penetrated/malware infected internal/trusted devices on the control system network 16. For example, a host computer (e.g. human machine interface 28) may become infected when an authorized user someone plugs an external storage device (e.g., a USB storage device) into the human machine interface 28. If the external storage device has a virus present therein, the virus may begin to probe other devices on the control system network 16 and/or the computer network 12 (e.g., typically, the human machine interface 28 is inside the security perimeter, so firewalls and/or intrusion prevention systems are typically unhelpful). This probing by the virus may operate to seek specific open ports/vulnerabilities for its spread and/or delivery of malicious payload. However, by detecting this activity (through the honeyports utilized in conjunction with the human machine interface 28, a broadcast/multicast message, for example, may be transmitted to the control system network 16 and/or the computer network 12, so that all devices blacklist (e.g., do not allow write commands from the affected device) until a specified event occurs (e.g., an operator can clear the event).

Figure 4:
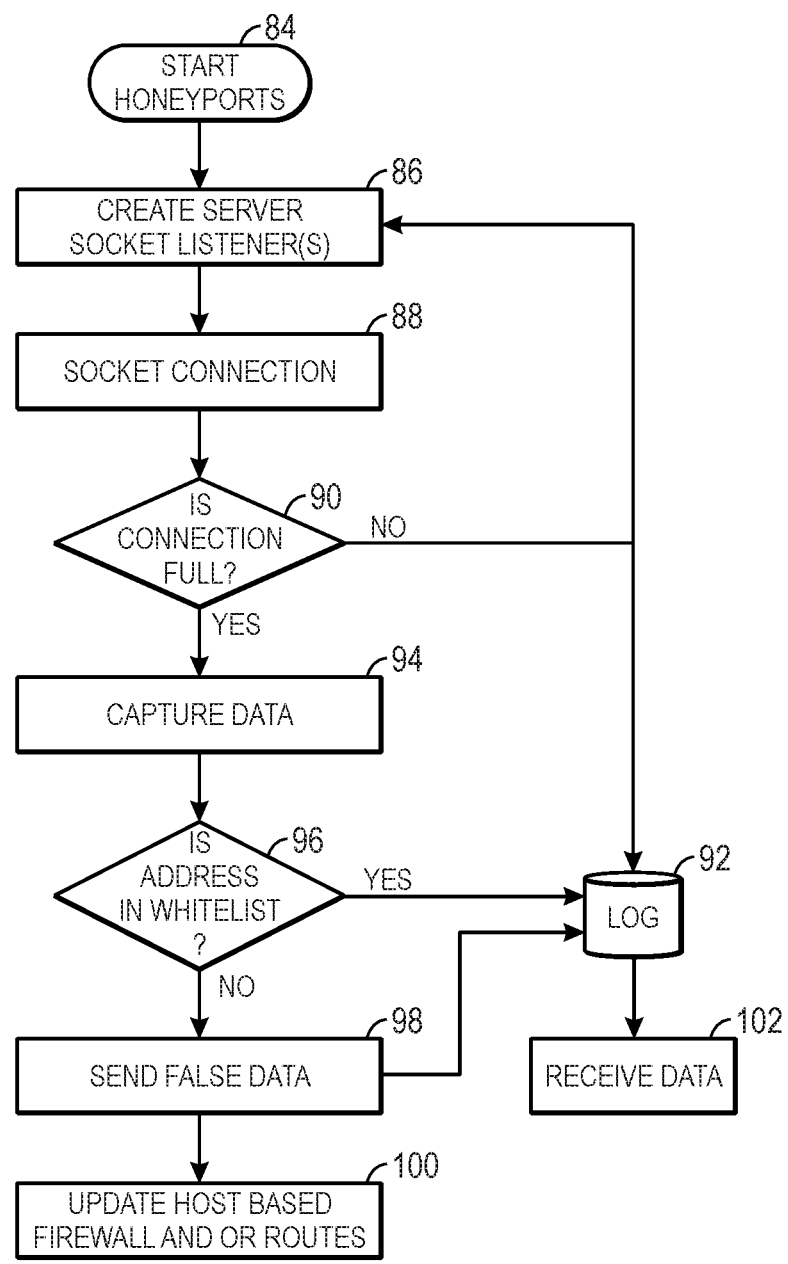
FIG. 4 is a flow chart view illustrating an embodiment of a method related to the operation of the industrial control system of FIG. 1, in accordance with an embodiment.

FIG. 4 illustrates a flow chart 82 that describes the operation of the human machine interface 28 running a honeyport (i.e., including an IDS sensor 46). In one embodiment, the steps of flow chart 82 may be partially or wholly performed by human machine interface 28 (e.g., by processor 70 running a software program, i.e., code, stored on a tangible machine readable medium, such as memory 72 and/or storage 74).

In step 84, the processor 70 may generate and initiate transmission of signals utilizing protocol B (i.e., dummy signals not linked to the actual operation of the ICS 10). In step 86, the processor 70 may create server socket listener(s) that operate to detect if signals are received utilizing transmission protocol B. As previously discussed, since signals with protocol B do not actually indicate operation of the ICS 10, but instead mimic an alternate protocol that a malicious user would expect to see, transmissions received/detected by processor 70 may indicate unauthorized access to the ICS 10 and/or the computer network 12.

Once the server socket listener(s) are created in step 86, the ICS 10 (for example, the human machine interface 28) may go into a steady state of "listening" for (detecting) signals using protocol B. Thereafter, at some point in time, a socket connection occurs in step 88. Step 88 indicates that the processor 70 has detected a transmission using protocol B.

Thereafter, in step 90, the processor 70 may determine if the connection is a full connection. That is, the processor 70 may determine if the connection is considered half-open (e.g., a full transmission control protocol connection has not occurred). If the connection is considered half-open, the processor 70 may log the event in step 92. This logging of the event in step 92 may include storing an indication of the event in, for example, storage 74 and/or in a server 26 (e.g., a network security server).

If, however, in step 90 the processor 70 determines that the connection is a full connection (e.g., a full transmission control protocol connection has occurred), then the process may proceed to step 94. In step 94, the processor 70 may, for example, capture information related to any remote client connection, a source IP address, or other information present in the communication. The processor 70 may also capture data received of predefined buffer size (e.g., the first 32 bytes, 64 bytes, 128 bytes, 256 bytes, 512 bytes, 1024 bytes, 2056 bytes, or another amount of data present in the received transmission) to aid in identification of a possible attribution date, browser agent, or other information that may be helpful in identifying the identity or source of the transmission.

In step 96, the processor 70 may determine if any of the captured information includes an address that matches a field of information on an ICS 10 and/or computer network 12 whitelist. This field of information may include, for example, a source address, a source port, a destination address, a destination port, a protocol layer (e.g., wired/wireless, IPv4, IPV6, etc.), a media access control (MAC) address, a MAC source address, a MAC destination address, signatures, checksums, a keyed-hash message authentication code (HMAC), a cryptographic hash, a fragmentation option, a hop count, or some combination thereof. Additionally, the packet payload data itself may be checked, such that whitelisting may be based on header/packet meta-data, and/or whitelisting based on DPI (deep packet inspection).

Thus, the processor 70 may check to see if the transmission identifying information (e.g., field) matches a list or register of entities that is authorized to be on the computer network 12 and/or the control system network 16. If, in step 96, the processor 70 determines that the identifying information of the transmission is on a whitelist, the processor 70 will log the event in step 92, for example, to be used to determine if an authorized addressee has been making irregular accesses (which may suggest intrusion).

If, however, in step 96 the processor 70 determines that the identifying information of the transmission is not on a whitelist, the processor 70 (in step 98) will attempt to engage the unauthorized user by transmitting false data to the sender of the detected socket connection. This false data may include, for example, a banner (which, in some embodiments may be null), a random data reply, and a random length reply. This false data transmission in step 98 may be an attempt to mimic the correct operation of the human machine interface 28 and may operate to increase the amount of time that an unauthorized user is in the ICS 10. By increasing the amount of time that an intruder is connected to (and attempting to access portions of the ICS 10 and/or the computer network 12), additional data may be gleaned from the unauthorized user so as to aid in determining the identity of the unauthorized user. Additionally, as part of step 98, a tarpit response may be undertaken, whereby delays are added for non-whitelist ports. That is, the connections may be purposefully delayed to extend the time an unauthorized access is occurring. Furthermore, additional types of delay may be added in step 98. For example, a decision may be implicated, for instance, some dynamic reconfiguration is desired. Accordingly, before sending a response, information is transmitted to a third party, who makes a decision, which then comes back to the system, thus delaying the traffic.

After false data is transmitted in step 98, any information received prior to and/or subsequent to the transmission of the false data may be logged in step 92. Additionally, the processor 70 may transmit a signal that alerts additional elements of the ICS 10 and/or the computer network 12 of the detection of an intruder so that, in step 100, defensive measures, such as updating a host based firewall and/or routes, may be undertaken to protect the ICS 10 and/or the computer network 12.

Additionally, in step 102, a security event manager (SEIM) engine may access logged data and receive any logged data and may, for example, reconfigure scripts for the ICS 10 and/or the computer network 28 or take other defensive measures to prevent access by the detected unauthorized user. In some embodiments, the SEIM engine may, for example, be present on a server 26 or 36 (e.g., a network security server). In some embodiments, the SEIM may be utilized in conjunction with the logged data. For example, the collected attribution data may be used to generate IDS/intrusion prevention system (IPS) signatures so that a network based IDS/IPS may be updated (since, for example, the IPS may be a superset of IDS functionality). Additionally and/or alternatively, the logged data can be utilized, for example, to update to a host based IDS (if installed, for example, in conjunction with the human machine interface). Furthermore, in some embodiments, a firewall rule set, for example, in the control system 20 (e.g., the control module 48 and/or the I/O cards 50) may be updated.

As discussed above, FIG. 4 illustrates how, through utilization of dummy transmissions, the human machine interface 28 may include an IDS sensor 46 and may operate as a honeyport that aids in the detection of unauthorized access to the ICS 10. However, additional elements of the ICS 10 may also include an IDS sensor 46. For example, as discussed in greater detail below, with respect to FIG. 5, the control system 20 may also implement one or more IDS sensors 46.

Figure 5:
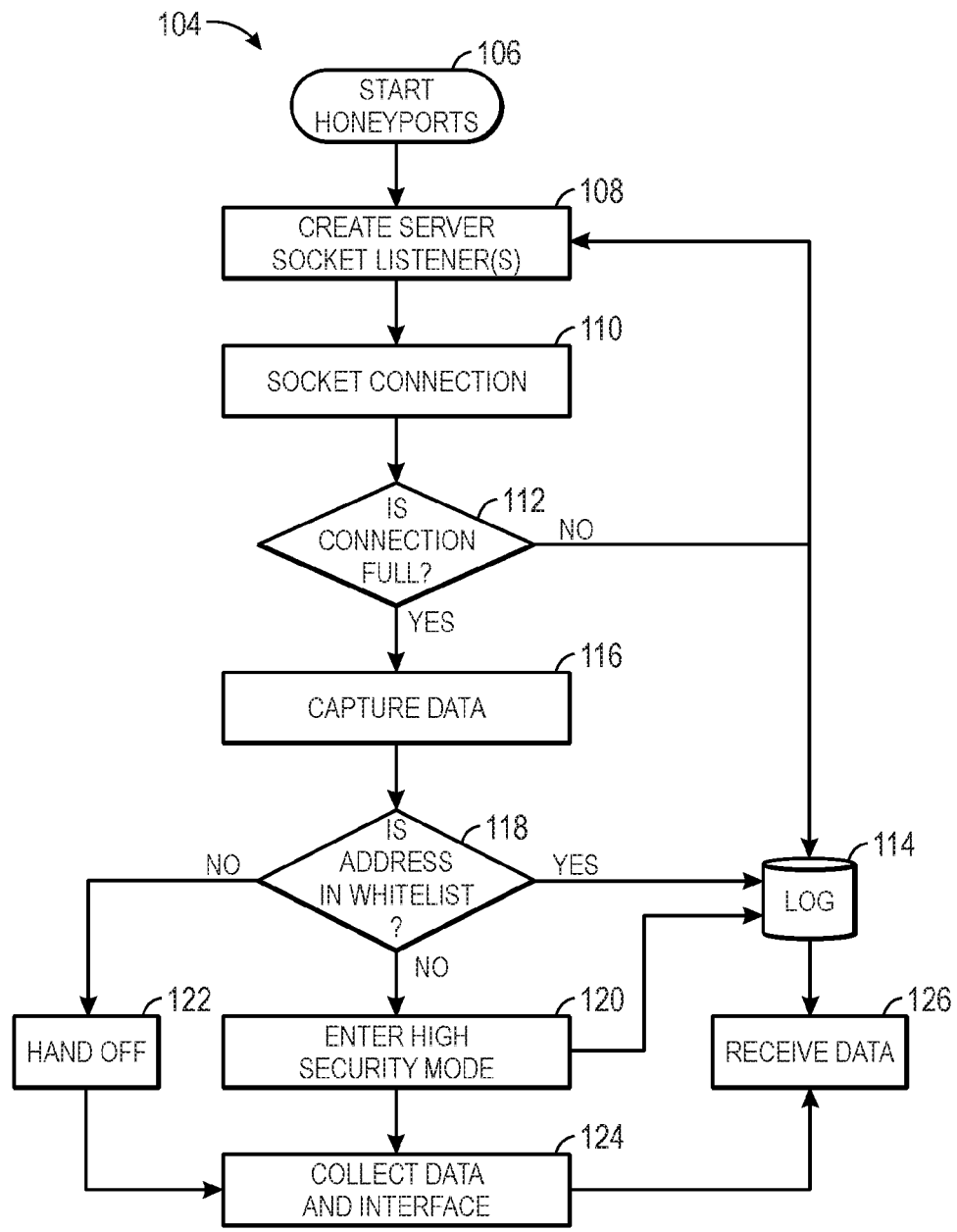
FIG. 5 is a flow chart view illustrating a second embodiment of a method related to the operation of the industrial control system of FIG. 1, in accordance with an embodiment.

FIG. 5 illustrates a flow chart 104 that describes the operation of the control system 20 running a honeyport (i.e., including an IDS sensor 46). In one embodiment, the steps of flow chart 104 may be partially or wholly performed by the control system 20 (e.g., by processor 52 running a software program, i.e., code, stored on a tangible machine readable medium, such as memory 54 and/or by processor 66 running a software program, i.e., code, stored on a tangible machine readable medium, such as memory 68). However, for the purposes of discussion only, the steps of flow chart 104 will be described in conjunction with the operation of a DSP 60 of control system 20 (it should be appreciated that these steps may also be performed, for example, by control module 48 of control system 20).

In step 106, the processor 66 may generate and initiate transmission of signals utilizing protocol B (i.e., dummy signals not linked to the actual operation of the ICS 10). In step 108, the processor 66 may create server socket listener(s) that operate to detect if signals are received utilizing transmission protocol B. As previously discussed, since signals with protocol B do not actually indicate operation of the ICS 10, but instead mimic an alternate protocol that a malicious user would expect to see, transmissions received/detected by processor 66 may indicate unauthorized access to the ICS 10 and/or the computer network 12. Once the server socket listener(s) are created, the ICS 10 (for example, the control system 20) may go into a steady state of "listening" for (detecting) signals using protocol B.

In step 110, a socket connection occurs. This step 110 indicates that the processor 66 has detected a transmission using protocol B. In step 112, the processor 66 may determine if the connection is a full connection. That is, the processor 66 may determine if the connection is considered half-open (e.g., a full transmission control protocol connection has not occurred). If the connection is considered half-open, the processor 66 may log the event in step 114. This logging of the event in step 114 may include storing an indication of the event in, for example, storage 64 and/or in a server 26 (e.g., a network security server).

If, however, in step 112 the processor 66 determines that the connection is a full connection (e.g., a full transmission control protocol connection has occurred), then the process may proceed to step 116. In step 116, the processor 66 may, for example, capture information related to any remote client connection, a source IP address, or other information present in the communication. The processor 66 may also capture data received of predefined buffer size (e.g., the first 32 bytes, 64 bytes, 128 bytes, 256 bytes, 512 bytes, 1024 bytes, 2056 bytes, or another amount of data present in the received transmission) to aid in identification of a possible attribution date, browser agent, or other information that may be helpful in identifying the identity or source of the transmission.

In step 118, the processor 66 may determine if any of the captured information includes an address that matches an address on an ICS 10 and/or computer network 12 whitelist. That is, the processor 66 may check to see if the transmission identifying information matches a list or register of entities that is authorized to be on the computer network 12 and/or the control system network 16. If, in step 118, the processor 66 determines that the identifying information of the transmission is on a whitelist, the processor 66 will log the event in step 114, for example, to be used to determine if an authorized addressee has been making irregular accesses (which may suggest intrusion).

If, however, in step 118 the processor 66 determines that the identifying information of the transmission is not on a whitelist, the processor 66 (in step 120) will enter a high security mode whereby the control system may only accept certain types of transmissions so that control of the machinery 22 may not take place remotely. Additionally and/or alternatively, the high security mode may include locking down the control system 20 until, for example, a physical reset is initiated locally at the control system to prevent access to the control system by the detected intruder. Additionally, as part of step 120, the processor 64 may log the captured information in step 114 and/or transmit a message to the STEM engine to check the logged data in step 126. The processor 66 may additionally and/or alternatively dynamically update the ICS 10 and/or the computer network 12 to make known the attacker, so as to protect the ICS 10 and/or the computer network 12.

Additionally and/or alternatively, in addition to the operation of the processor 66 described above with respect to step 120, the control system 20 may also undertake the actions of step 122 in response to the processor 66 determining that the identifying information of the transmission is not on a whitelist in step 118. In step 120, the processor 66 may forward interaction with the attacker, for example, to a network security server (e.g., server 26 or 36) running a honeypot designed to capture additional information from the intruder.

Accordingly, in step 124, the server 26 and/or 36 may generate randomized responses or evasive/deceptive responses to confuse the attacker and as well as engage the attacker while forensic and attribution data is collected by the server 26 and/or 36. Additionally, either or both of the processor 66 and the server 26 and/or 36 could send information to the SEIM engine to, for example, via logging collected information in step 114 and by transmitting a message to the SIEM engine to check the logged data in step 126. The processor 66 and/or the server 26 and/or 36 may additionally and/or alternatively dynamically update the ICS 10 and/or the computer network 12 to make known the attacker, so as to protect the ICS 10 and/or the computer network 12.

In this manner, the ICS 10 may include separate elements that may incorporate IDS sensors 46. These sensors 46, as well as the techniques utilizing the sensors 46, may aid in detection of unauthorized users attempting to access the ICS 10. Thus, through the use of honeyports that operate to transmit decoy or false transmissions that may mirror actual ICS 10 transmissions, attackers may more easily be identified and information related to their identity may be captured, while additionally allowing for update of network security to protect the ICS 10 and/or computer network 12 from the detected intrusion.

This written description uses examples to disclose the above description, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A device, comprising:
    a processor configured to:
        generate a first signal using a first communication protocol, wherein the first signal corresponds to data transmitted to the processor using the first communication protocol, wherein the first communication protocol is a protocol utilized to communicate between the processor and at least one node coupled to the processor in a network;
        generate a second signal using a second communication protocol, wherein the second signal comprises decoy data generated by the processor as part of a network security protocol, wherein the second signal is generated independently from the data transmitted to the processor;
        transmit the first signal as an actual signal for reception by the at least one node and transmit the second signal as a decoy signal in parallel with one another;
        detect a transmission using the second communication protocol; and
        capture data present in the transmission using the second communication protocol for logging of the captured data to be utilized in the generation of an intrusion detection system (IDS) signature or generation of an intrusion prevention system (IPS) signature.

2. The device of claim 1, wherein the device is configured to transmit the captured data to a security engine for generation of the IDS signature or for generation of the IPS signature.

3. The device of claim 2, wherein a network based IDS or a network based IPS is updated based on the generated IDS signature or the generated IPS signature, respectively.

4. The device of claim 2, wherein a host based IDS or a host based IPS is updated based on the generated IDS signature or the generated IPS signature, respectively.

5. The device of claim 2, wherein a firewall rule set is updated based on the generated IDS signature or the generated IPS signature.

6. The device of claim 2, wherein the at least one node comprises an IDS sensor configured to be updated based on the generated IDS signature or the generated IPS signature.

7. The device of claim 2, wherein the security engine is included in a network security server.

8. A non-transitory computer-readable medium having computer executable code stored thereon, the code comprising instructions to:
    generate a first signal using a first communication protocol, wherein the first signal corresponds to data transmitted to a processor using the first communication protocol, wherein the first communication protocol is a protocol utilized to communicate between the processor and at least one node coupled to the processor in a network;
    generate a second signal using a second communication protocol, wherein the second signal comprises decoy data as part of a network security protocol, wherein the second signal is generated independently from the data transmitted to the processor;
    transmit the first signal as an actual signal for reception by the at least one node and transmit the second signal as a decoy signal in parallel with one another;
    detect a transmission using the second communication protocol; and
    capture data present in the transmission using the second communication protocol for logging of the captured data to be utilized in the generation of an intrusion detection system (IDS) signature or generation of an intrusion prevention system (IPS) signature.

9. The non-transitory computer-readable medium of claim 8, wherein the code comprises instructions to transmit the captured data to a security engine for generation of the IDS signature or for generation of the IPS signature.

10. The non-transitory computer-readable medium of claim 9, wherein a network based IDS or a network based IPS is updated based on the generated IDS signature or the generated IPS signature, respectively.

11. The non-transitory computer-readable medium of claim 9, wherein a host based IDS or a host based IPS is updated based on the generated IDS signature or the generated IPS signature, respectively.

12. The non-transitory computer-readable medium of claim 9, wherein a firewall rule set is updated based on the generated IDS signature or the generated IPS signature.

13. The non-transitory computer-readable medium of claim 9, wherein the at least one node comprises an IDS sensor configured to be updated based on the generated IDS signature or the generated IPS signature.

14. The non-transitory computer-readable medium of claim 9, wherein the security engine is included in a network security server.

15. A method, comprising:
    receiving captured data at a security engine from a processor configured to:
        generate a first signal using a first communication protocol, wherein the first signal corresponds to data transmitted to the processor using the first communication protocol, wherein the first communication protocol is a protocol utilized to communicate between the processor and at least one node coupled to the processor in a network;
        generate a second signal using a second communication protocol, wherein the second signal comprises decoy data generated by the processor as part of a network security protocol, wherein the second signal is generated independently from the data transmitted to the processor;

transmit the first signal as an actual signal for reception by the at least one node and transmit the second signal as a decoy signal in parallel with one another;

detect a transmission using the second communication protocol;

capture data present in the transmission using the second communication protocol for logging of the captured data; and transmit the captured data to the security engine; and generating an intrusion detection system (IDS) signature or an intrusion prevention system (IPS) signature at the security engine based on the captured data.

16. The method of claim 15, comprising updating a network based IDS or a network based IPS based on the generated IDS signature or the generated IPS signature, respectively.

17. The method of claim 15, comprising updating a host based IDS or a host based IPS based on the generated IDS signature or the generated IPS signature, respectively.

18. The method of claim 15, comprising updating a firewall rule set based on the generated IDS signature or the generated IPS signature.

19. The method of claim 15, comprising updating the at least one node comprising an IDS sensor based on the generated IDS signature or the generated IPS signature.

20. The method of claim 15, wherein receiving the captured data at the security engine comprises receiving the captured data at the security engine of a network security server.

* * * * *